(12) United States Patent
Thomas (10) Patent No.: US 10,895,279 B2
(45) Date of Patent: Jan. 19, 2021

(54) SUCTION CUP HAVING A SNAP DOME

(71) Applicant: Götz Thomas, Itzehoe (DE)

(72) Inventor: Götz Thomas, Itzehoe (DE)

( * ) Notice: Subject to any disclaimer, the term of this patent is extended or adjusted under 35 U.S.C. 154(b) by 344 days.

(21) Appl. No.: 15/776,368

(22) PCT Filed: Nov. 15, 2016

(86) PCT No.: PCT/EP2016/001903
§ 371 (c)(1),
(2) Date: May 15, 2018

(87) PCT Pub. No.: WO2017/084751
PCT Pub. Date: May 26, 2017

(65) Prior Publication Data
US 2020/0240460 A1    Jul. 30, 2020

(30) Foreign Application Priority Data
Nov. 21, 2015 (DE) .......................... 10 2015 015 114

(51) Int. Cl.
*F16B 47/00* (2006.01)
(52) U.S. Cl.
CPC .................................... *F16B 47/00* (2013.01)
(58) Field of Classification Search
CPC combination set(s) only.
See application file for complete search history.

(56) References Cited

U.S. PATENT DOCUMENTS 1,842,383 A * 1/1932 Bell .................. F16B 47/00
                                                   248/206.2
3,152,711 A   10/1964 Mumford
(Continued)

FOREIGN PATENT DOCUMENTS

| DE | 10317788 | 12/2004 |
|---|---|---|
| DE | 102009004975 | 12/2009 |
| WO | 2015077658 | 5/2015 |

OTHER PUBLICATIONS

ISR 01302017, International Search Report cited in the corresponding International Application No. PCT/EP2016/001903; dated Jan. 30, 2017; 4 pages.

*Primary Examiner* — Monica E Millner
(74) *Attorney, Agent, or Firm* — Lempia Summerfield Katz LLC (57) ABSTRACT

The invention relates to a suction cup (10) for detachable fastening to a substrate (12), the suction cup (10) comprising a supple sealing material (26) for applying to the substrate (12) and an elastically deformable actuating part for pressing against the substrate (12), and uses elastic recovery of the actuating part to produce a vacuum between the suction cup (10) and the substrate (12). The aim of the invention is to be able to produce the suction cup (10) very inexpensively, with an aesthetically pleasing appearance, a very low thickness, and good adhesion even on less than smooth substrates. To this end, the actuating part comprises a snap-action disk (20), the front or visible side (22) thereof facing away from the sealing material (26) being at least partially convexly domed in a stable idle state, and the snap-action disk being at least partially deformable into a metastable or unstable deformation state in which the front or visible side (22) is at least partially concavely domed, by means of a compressive force exerted on the front or visible side (22), and automatically returning back to its original shape in the direction of the idle state when the compressive force is released.

20 Claims, 7 Drawing Sheets

(56) References Cited

U.S. PATENT DOCUMENTS

| | | | |
|---|---|---|---|
| 3,160,302 A | 12/1964 | Chaplin | |
| 3,514,065 A * | 5/1970 | Donaldson | F16B 47/00 248/363 |
| 4,356,989 A * | 11/1982 | Ireland | B25B 11/007 248/205.9 |
| 4,680,333 A | 7/1987 | Davis | |
| 4,933,522 A | 6/1990 | Celander | |
| 5,078,356 A * | 1/1992 | Adams | F16B 47/00 248/206.2 |
| 5,133,524 A | 7/1992 | Liu | |
| 5,624,986 A | 4/1997 | Bunnelle et al. | |
| 5,964,437 A * | 10/1999 | Belokin | F16B 47/00 248/205.5 |
| 6,143,391 A | 11/2000 | Barnes et al. | |
| 7,175,898 B2 | 2/2007 | Luhmann et al. | |
| 7,378,609 B1 * | 5/2008 | Fedorjaka | H01H 13/705 200/406 |
| 8,186,642 B2 * | 5/2012 | Weiss-Vons | B65H 75/143 248/205.5 |
| 8,251,323 B2 | 8/2012 | Liu | |
| 8,604,375 B2 | 12/2013 | Yltchev et al. | |
| 9,488,214 B2 * | 11/2016 | Orban | F16B 47/00 |
| 10,477,987 B2 * | 11/2019 | White | A47F 5/0807 |
| 2004/0265529 A1 | 12/2004 | Luhmann et al. | |
| 2008/0078896 A1 * | 4/2008 | Browne | F16B 1/0014 248/205.8 |
| 2008/0164133 A1 * | 7/2008 | Hayafune | H01H 13/64 200/516 |
| 2010/0175975 A1 | 7/2010 | Yltchev et al. | |
| 2010/0181458 A1 * | 7/2010 | Liu | F16B 47/00 248/363 |
| 2015/0136922 A1 * | 5/2015 | Shamsadov | F16B 47/00 248/206.2 |

* cited by examiner

SUCTION CUP HAVING A SNAP DOME

RELATED APPLICATION DATA

This application is a U.S. national stage of and claims priority benefit to prior filed international application no. PCT/EP2016/001903, which was filed Nov. 15, 2016, and which claims priority to German national application no. 102015015114.2, which was filed Nov. 21, 2015. The entire contents of these prior filed applications are hereby incorporated by reference herein.

BACKGROUND

1. Field of the Disclosure

The invention relates to a suction cup for removably fastening to a substrate, wherein the suction cup comprises a compliant sealing material for application to the substrate and an elastically deformable actuating portion for pressing against the substrate and utilizes an elastic recovery of the actuating portion in order to generate a negative pressure between the suction cup and the substrate. 2. Description of Related Art Suction cups of the type mentioned in the introduction have been used for a long time for detachably fastening objects on surfaces of air-impermeable substrates, such as tiles, by applying the suction cup with the sealing material to the substrate along an annular contact area and by then pressing the actuating portion in the center of the suction cup under deformation against the substrate, in order to displace the air between the suction cup and the substrate. When the compressive force is relieved, a partial elastic recovery of the actuating portion takes place, creating a negative pressure between the suction cup and the substrate, which subsequently will press the suction cup against the substrate.

In many commercially available inexpensive suction cups of this type, the elastically deformable actuating portion and the flexible sealing material are integrated into a single molded body made of plasticized PVC. These suction cups are indeed very inexpensive but, however, will adhere only to very smooth flat substrates and have an aesthetically less attractive appearance.

In order to improve the adhesion to the substrate, suction cups of the type mentioned above have already been proposed, where the elastically deformable actuating portion is made of a material, the elasticity of which is substantially greater than the elasticity of the compliant sealing material. As a result, on the one hand the restoring forces, which bring about the elastic recovery, can be increased, and, on the other hand, the sealing material can be made more compliant in order to allow a better adaptation to irregularities of the substrate. Examples of such suction cups can be found, for example, in U.S. Pat. Nos. 5,133,524, 6,143,391 and 8,251, 323.

From WO 2015/077658 A1 (US 2015/0136922) a suction cup with a domed spring is known, which, when being attached to a substrate, is deformed from a state that is concave in relation to the substrate, i.e. curved towards the substrate, into a state that is convex in relation to the substrate, i.e. curved away from the substrate, by exerting a compressive force onto an annular actuating portion that surrounds the spring. A sealing material between the spring and the substrate is thereby deformed, creating a negative pressure between the sealing material and the substrate. Since both the annular actuating portion and the sealing material have to have a certain minimum thickness, the suction cup cannot be designed to be quite flat. In addition, the suction cup consists of several parts, as a result of which the costs for its production increase.

SUMMARY

Starting out from this, it is an object of the invention to improve a suction cup of the type mentioned in the introduction, such that it can be produced inexpensively and has an aesthetically pleasing appearance, for example a visible or front side made of stainless steel that faces away from the substrate, a very small thickness and a good adhesive capacity, also on substrates that are not totally smooth.

This object is achieved according to the invention in that the actuating portion comprises a snap dome, whose front or visible side facing away from the sealing material is at least partially convexly curved in a stable rest state, which can be at least partially deformed by a compressive force exerted onto the front or visible side into a metastable or unstable deformation state, where its front or visible side is at least partially concavely curved, and which recovers by itself in the direction of the rest state when the compressive force is relieved.

While, for the deformation of the domed round leaf spring according to WO 2015/077658 (US 2015/0136922) A1 between a stable convexly curved state and a stable concavely curved state in each deformation direction, a force has to be applied in order to deform the leaf spring into a bi-stable, generally flat intermediate state in the middle between the two stable states, from where it will then snap into the respective opposite stable state, releasing energy. This is not the case with snap domes. There, a compressive force needs to be applied to the snap dome only for the deformation from the stable rest state into the unstable or metastable deformation state. On the contrary, the recovery into the stable rest state takes place by itself without the need to apply a force. Instead, the deformation energy stored in the snap dome is exploited for the recovery.

For fastening the suction cup to a substrate, the features according to the invention allow to apply it in the rest state to the substrate, where the sealing material, on account of the convex curvature of the visible or front side of the snap dome, will abut only annularly against the substrate along an outer circumference of the suction cup or of the snap dome. If, in this state, a sufficiently large compressive force is applied from the front or visible side to the center of the snap dome, the snap dome is partially deformed from the stable rest state into the metastable or unstable deformation state, until the sealing material abuts against the substrate essentially over its entire surface area. Thereby, deformation energy is stored in the snap dome. If the snap dome is suitably dimensioned, after the relief of the compressive force the stored deformation energy, or elastic restoring force respectively, is large enough to induce a spontaneous recovery of the snap dome from the unstable or metastable deformation state in the direction of the rest state, despite the pressure difference between the ambient pressure acting onto the visible or front side and the negative pressure created between the substrate and the rear side. As soon as the snap dome leaves the deformation state, the sealing material is lifted off the substrate behind the center of the snap dome, forming a cavity. Due to the annular contact of the sealing material around the cavity, no air can enter into the cavity, so that a negative pressure is generated therein. The negative pressure, or the ambient pressure acting onto the front or visible side of the snap dome in front of the cavity respectively, will then sealingly press the sealing material against the substrate around the cavity, so that also thereafter no air can enter into the cavity.

Snap domes are known per se and have long been used in twist-off screw covers of preserve jars, where a negative pressure in the interior of the jar holds the central part of the lid, which is in the form of a snap dome, in a metastable or unstable state, until an inflow of air into the interior of the jar causes a recovery into the stable rest state, as disclosed, for example, in U.S. Pat. Nos. 3,152,711 and 3,160,302. In addition, snap domes are also used in push-button switches of operating parts of electronic devices, such as, for example, computer mice, where the switches should have a noticeable pressure point. In this case, the deformation of the snap dome from the rest state is used to produce an electrical contact, while the recovery into the rest state permits a tactile perception, as described in https://de.wikipedia.org/wiki/knackfrosch. Furthermore, snap domes are also referred to as Knackfrosch or clicker, because if suitably dimensioned, audible clicks or clicking sounds are generated both during their deformation into the deformation state and during the return to the rest state. In the suction cups according to the invention, however, these noises are dampened by the sealing material.

In the snap domes that are used for the aforementioned purposes, the maximum stroke during the deformation between the rest state and the deformation state is mostly less than 2 mm. Surprisingly, it could be demonstrated that such a stroke is more than sufficient, in order to generate, between the substrate and the deformable portion of the snap dome, a negative pressure, which will retain the suction cup even on not totally flat substrates with a great force and over a long period of time. However, this requires that the substrate is airtight, so that no air can penetrate through it into the cavity, and that a suitable sealing material and an airtight snap dome or airtight actuating portion are used. In connection with the low material thickness of the snap dome and of the sealing material the low stroke of the snap dome permits to produce very flat suction cups.

If, within the scope of the present patent application, the terms "convexly curved" or "concavely curved" are used, these terms relate to the substrate to which the suction cup is fastened, wherein "convex" means curved away from the substrate and "concave" means curved towards the substrate. If the term "dome" is used, this means "snap dome".

In the context of the present patent application, the term "unstable deformation state" means that the snap dome will immediately return to the rest state after it has been pressed against a substrate, in spite of the generation of the negative pressure behind its rear side. This is the case when the elastic restoring force of the snap dome in the deformation state is greater than that force exerted by the air pressure in the vicinity of the suction cup on a deformable central portion of the snap dome.

On the other hand, the term "metastable deformation state" means that when relieving the compressive force after having pressed the snap dome against a substrate the snap dome will only return to the rest state after a delay, for example after a small amount of air has penetrated into the cavity. This is the case when the elastic restoring force of the snap dome in the deformation state is less than that of the force exerted onto the deformable central portion of the snap dome by the air pressure in the vicinity of the suction cup. Astonishingly, also in the metastable state of the snap dome, i.e. prior to the return to the stable rest state, the suction cup is retained to the substrate by means of the negative pressure, even though after the force relief the stroke is only a few tenths or hundredths of a millimeter.

When the snap dome is deformed into the deformation state by the application of a force without pressing the suction cup against a substrate, then the deformation state will always be an unstable state. In this case, the snap dome always will immediately return by itself to the rest state when the force is relieved.

Snap domes which are designed and dimensioned in such a way that their deformation state is an unstable state, so that their deformed portion will immediately return to the rest state after the relief, have the advantage of a tactile feedback and possibly an audible feedback to the user. On the other hand, the user cannot visually recognize offhand, whether the suction cup is securely retained to the substrate by a negative pressure.

Snap domes which are designed and dimensioned in such a way that their deformation state is a metastable state, so that their deformed portion does not immediately return to the rest state after the relief, have the advantage that due to the concave curvature of the visible or front side the user can visually recognize that the suction cup is retained to the substrate by a negative pressure. On the other hand, there will be no tactile or audible feedback.

In principle, the snap dome of the suction cup can be produced from any material having a high elasticity, that is to say both from a metal or from a plastic. Since the suction cup can be made flatter the thinner the snap dome is, it is however expedient to use snap domes made of steel and preferably of spring steel, which combine a very high elasticity with low production costs. Advantageously the snap dome is made from sheet steel having a tensile strength of more than 500 N/mm$^2$, preferably more than 600 N/mm$^2$, and a modulus of elasticity of more than 150,000 N/mm$^2$. A production from stainless steel is particularly preferred, on the one hand for aesthetic reasons and on the other hand, because then even in moist environments no corrosion protection is needed. In this case, the snap dome expediently consists of a stainless chromium-nickel steel. Preferably, an austenitic spring band steel having the designation X10CrNi18-9 and the material no. 1.4310 (ASTM A666/AISI: type 301/302) is used, the material thickness of which is expediently 0.1 to 0.6 mm, depending on the size or surface area of the snap dome. However, snap domes made of painted or galvanized steel can also be used. In this case at least the visible or front side and a portion of the rear side, which is not covered by the sealing material, are painted, tin-plated or galvanically coated, for example nickel-plated or chromium-plated. In both cases, the snap dome can be manufactured with a very attractive aesthetic appearance and low costs, in particular when the suction cup consists only of the snap dome and the sealing material.

For household applications, such as suction hooks, the preferred diameter of round snap domes is in the range between 30 and 50 mm, while the diameter of the deformable portion is preferably between 25 and 40 mm. The compressive force necessary for deforming the snap dome from the rest state into the deformation state is preferably between approximately 30 N and approximately 200 N, for household applications between about 30 N and about 60 N. At a diameter of about 40 mm, adhesive forces between approximately 40 and 160 N or more perpendicular to the substrate and of up to 25 N or more parallel to the substrate can thus be attained.

When using snap domes made of spring band steel these adhesive forces can already be achieved with very flat suction cups, the thickness of which is less than 2 to 3 mm, because the sealing material, in the region of the annular sealing surface, also only needs to have a thickness of approximately 0.5 to 2 mm. In order to permit a very flat design of the suction cup, in the rest state the maximum angle of inclination of the visible or front side of the snap dome in relation to the planar substrate is further preferably less than 10 degrees. As a result, the visible or front side of the dome has only a scarcely perceptible curvature in the center, which will improve the aesthetic appearance and furthermore reduce the force required for deforming the dome. A preferred embodiment of the invention provides that the ratio of the maximum height dimension at the highest point of the visible or front side to the diameter of the snap dome is less than 1:10, preferably less than 1:12.5 and most preferably less than 1:15. In the case of a dome diameter of between 30 and 50 mm, in this case, in the rest state, the distance of the highest point of the visible or front side from the substrate and thus the maximum height of the suction cup in the region of the snap dome is less than 4 mm and most preferably less than 3 mm.

In order to further improve the aesthetic appearance compared to known suction cups, the suction cup preferably has a closed front or visible face, where the snap dome completely covers the sealing material, so that only the former is visible. As a result, air will be prevented from penetrating through the snap dome into the cavity as well.

In principle, it is possible to provide the sealing material on a separate annular rim element of the suction cup, to which the snap dome as a separate component is fastened. Advantageously, however, apart from the snap dome as an actuating portion and the sealing material, the suction cup does not have any further parts, which will greatly simplify the production and make it less expensive.

A further preferred embodiment of the invention provides that the snap dome comprises a central portion, which will be deformed into the deformation state when pressing the suction cup against a substrate, and a peripheral rim portion surrounding the central portion, which will not be deformed or will only be slightly deformed when pressing the suction cup against the substrate.

In this case, at least the peripheral rim portion is provided on its rear side with the sealing material, so that the latter will abut against the substrate along an annular flat sealing surface when the suction cup is pressed against the substrate and after the compressive force has been relieved. Preferably, however the complete dome, i.e. the peripheral rim portion and the central portion, are coated with the sealing material on the rear side that faces the substrate. The sealing material is formed in such a way that in the deformation state preferably it will completely fill the space between the uneven rear side of the dome and the substrate and will abut flush against the substrate, so that in the deformation state, the air between the rear side of the dome and the substrate will be completely displaced.

Advantageously the peripheral rim portion and the central portion have a circular outline, so that when exerting a compressive force onto the central portion the peripheral rim portion will be pressed along its entire circumference against the substrate with a same force. However, other outlines of the peripheral rim portion and of the central portion are possible, such as, for example, polygonal with rounded corners, oval or elliptical, where however, the ratio of the largest to the smallest cross-sectional dimension should be less than 2.5:1 and preferably less than 2:1. Further, the peripheral rim portion does not everywhere have to have the same width, but can be of differing width, for example, for compensation of different forces around the periphery of the central portion. Expediently, at least an outermost circumferential rim section of the peripheral rim portion is planar.

A good sealing action between the sealing material on the rear side of the peripheral rim portion and the substrate is achieved, when high surface pressures prevail on the annular sealing surface. For this purpose, according to a preferred embodiment of the invention the width of the sealing surface is less than 10 mm and advantageously less than 6 mm. As a result, on one hand, the dimensions of the suction cup in a direction parallel to the substrate can be kept small for the same compressive force. On the other hand, in particular on uneven substrates having a uniform surface structure composed of small elevations and depressions, such as e.g. on uniformly coarse tiles, a high surface pressure provides for an excellent sealing effect and hence for a long adhesive life of the suction cup.

In principle, the whole snap dome, or its central portion respectively, can be uniformly convexly curved away from the substrate. In order to facilitate the deformation, the dome and/or the central portion thereof are however advantageously divided into a plurality of annular regions, which have different angles of inclination with respect to the planar peripheral rim portion, or the flat substrate respectively. In the case of circular domes said regions are advantageously concentric to the center of the dome.

As with snap domes of twist-off lids, in the rest state these regions comprise preferably, from the outside to the inside, a generally planar outermost region, an adjoining frusto-conical region, an adjoining convexly curved region, where the maximum angle of inclination is less than that of the frusto-conical region and is preferably less than 10 degrees in relation to the planar substrate, and a central region, which can be planar or slightly curved. If, in the rest state, a sufficiently large compressive force is applied to the center of the visible or front face of such a dome the entire central portion will deform and the region that is convexly curved in the rest state will abruptly snap into a concavely curved deformation state. The generally planar outermost region and the frusto-conical region will substantially retain their shape but, however, the angle of inclination of the latter will become somewhat less.

Advantageously, the snap dome is manufactured by punching and forming from sheet metal, so that for the completion of the suction cup subsequently only the sealing material needs to be applied to the side of the dome that faces the substrate in order to produce a suction cup, which, in the state of use, consists of one single part and, besides the dome and the sealing material, advantageously comprises no further components. If necessary, however, an adhesive or adhesion promoter may be provided, that causes or improves the adhesion of the sealing material to the dome.

As far as the intended use of the suction cup, such as a portion of a suction hook or as a means for releasably attaching an object to the substrate, portions that project beyond the peripheral rim portion of the snap dome, such as e.g. a hook or retaining lugs, or recesses or holes in the dome, can be simultaneously formed during the punching and forming operations.

A further preferred embodiment of the invention provides that the sealing material is molded to the snap dome in order to conform it to the shape of its rear side and to air-tightly and fixedly bond the two components. This simplifies the production, allows the manufacture of a suction cup that in use consists of a single piece, and counteracts the ingress of air into the cavity through the sealing material. Preferably the whole rear side of the dome that faces the substrate is coated with the sealing material, which is applied onto the dome in a continuous layer. However, along the outer circumference of the dome, a narrow strip may remain uncoated, so that after the attachment of the suction cup to the substrate, the sealing material is not visible or less noticeable.

Preferably, the sealing material is shaped in such a way that the rear side of the sealing material that faces away from the snap dome in the rest state of the dome has a raised annular planar sealing surface for application to the planar substrate and a shallow concave depression surrounded by the sealing surface, whereas in the deformation state of the dome it spans a plane or is almost completely flat. Through the former the portion of the dome surrounded by the sealing surface can be deformed from the convex rest state into the deformation state, without the sealing material therein abutting against the substrate prior to reaching the deformation state. As a result of the latter, in the deformation state of the dome, substantially all of the air is displaced from the gap between the planar rear side of the sealing material and the opposing planar surface of the substrate, which is of importance in the suction cup according to the invention due to the small volume of the cavity. According to a preferred embodiment of the invention, the sealing material forms a continuous closed layer, the thickness of which in the center or in the region of the center portion is less than at the outer circumference or in the region of the peripheral rim portion of the annular sealing surface or, from an outer circumference or peripheral rim portion to a center of the snap dome first increases and then decreases.

In known suction cups of the type mentioned in the introduction, the volume of the cavity, in which the negative pressure is generated, depends on the tensile force which is exerted on the suction cup. In contrast, in the suction cup according to the invention the volume of this cavity after the return of the snap dome into the rest state is the same as the volume of the shallow concave depression and thus of the cavity that is enclosed between the sealing material and the substrate after the application of the sealing material to the substrate and before the deformation of the snap dome.

The depth of the shallow concave depression in relation to the surrounding sealing surface preferably corresponds to the stroke of the center of the snap dome during the deformation from the rest state into the deformation state, or is slightly less, so that the sealing material, after the snap dome has been pressed against the substrate, bears against the latter over the whole surface area. On the other side, the depth of the shallow concave depression should be more than half of the stroke of the center of the snap dome during the deformation from the rest state into the deformation state, so that sufficient deformation energy is stored in the snap dome.

The adhesion of the sealing material to the snap dome can be permanent, so that the dome neither can be released from the sealing material under shear stress nor by being pulled off. Alternatively, however, it can also be provided that the sealing material can be released from the dome, if required, so that after a longer use of the suction cup the aged sealing material can be replaced prior to reuse.

In principle, any material the suitability of which for suction cups is already known from the prior art can be used as the sealing material, such as, for example, plasticized PVC or various elastomers and rubbers or rubber materials. A thermoplastic sealing material is preferably used, since thermoplastic sealing materials can be molded in a simple manner to the dome, e.g. by injection molding, and thus no additional adhesive is necessary for gluing them onto the dome. Expediently, a sealing material having a Shore hardness C of less than 30 and better of less than 20 is used, since the sealing of the cavity can usually be improved with decreasing Shore hardness C.

However, many sealing materials known from the prior art, such as, for example, plasticized PVC, are only suitable for suction cups for smooth flat substrates. If the suction cup is also to be used on generally flat but rough substrates, the sealing material better comprises an airtight removable adhesive, preferably a pressure sensitive adhesive, which is also referred to as pressure sensitive adhesive (PSA). The pressure-sensitive adhesive (PSA) can be applied to the surface that faces the substrate of an airtight elastomer, gel or foam material, which then forms the sealing material together with the pressure-sensitive adhesive (PSA).

Preferably, however, a sealing material is used which consists of a hot melt pressure sensitive adhesive (hot melt PSA). Hot melt pressure sensitive adhesives are adhesives based on thermoplastic rubber (TK) that do not set completely but remain permanently tacky. Preferably, hot melt adhesives are used which are based on block copolymers and are rendered tacky with at least one resin. In this case, a distinction is made between permanently adhesive and removable types that have less bond strength (low tack). The latter are also referred to in English as "fugitive glues", "e-z-release glues" "booster glues" or "credit card glues", because they are frequently used for the removable adhesion of credit cards to stationary. These removable hot melt adhesives having a low bond strength are very advantageous for the suction cup according to the invention, since they can be easily removed from solid substrates, such as tiles, glass, wood, melamine or sheet metal, without any residue. In addition, it has been found that by means of the contact pressure of the dome, or the negative pressure in the cavity respectively, on the above-mentioned substrates these hot melt pressure sensitive adhesives also guarantee a long-lasting good sealing of the cavity even if the substrate has a rough surface. In addition, sealing materials in the form of hot melt pressure sensitive adhesives also impart higher adhesive forces to the suction cup, both in a direction perpendicular to the substrate and parallel to the substrate. The reasons for these properties are probably that the high surface pressure between the sealing material and the substrate, which is due to the contact pressure of the dome, or to the negative pressure in the cavity respectively, in conjunction with the resilience of the pressure sensitive adhesive even on rough substrates will have as a result that the pressure sensitive adhesive, on its entire contact surface, adheres tightly and without any gaps to the substrate and forms an airtight adhesive bond with the substrate.

Suitable removable hot melt adhesives are described, for example, in DE-A-103 17 788, U.S. Pat. Nos. 4,680,333 and 5,624,986, the entire contents of which are hereby incorporated by reference. In commerce suitable removable hot melt adhesives are available, for example under the name Peeltec 210, Bühnen 1585, Bühnen 1645, Tecbond 2507 FS, Tecbond 269 CT, Tesa TACK, 3M 3798 LM or Technicoll 9301. Most suitable are those having a low bond strength (low tack). The bond strength (tack) indicates the property to adhere to a surface under slight pressure. The bond strength is preferably less than 250 g, measured with a Polyken Probe Tack Tester at 23° C., residence time 1 s, and can be 0 g or almost 0 g, such as, for example, in the case of Peeltec 210 or 3M 3798 LM (tack free). In this case, prior to use, there is no need for a cover film for covering the pressure sensitive adhesive.

It is preferable to use hot melt adhesives, the melting point of which is above 100° C. and most preferably above 120° C., so that they will not soften at higher ambient temperatures. However, on the other hand, the application of the pressure sensitive adhesive to the dome is facilitated, when the melting point is below 250° C. and still better below 200° C.

Some pressure-sensitive adhesives have a tendency to creep under the pressure of the ambient air after the suction cup has been fastened. On one hand, this will improve the sealing of the cavity, however on the other hand the sealing material adjoining the cavity will change its shape somewhat. Under certain circumstances, this has the consequence that after some time the dome can no longer be deformed into the deformation state after, for example after the suction cup has been removed from the substrate, which will make a reuse of the suction cup difficult. In this case, the sealing material expediently comprises a removable pressure-sensitive adhesive only behind the peripheral rim portion or in the region of the sealing surface, while otherwise it advantageously consists of another resilient material, which does not tend to creep, preferably a more elastic material that, even after a relatively long time, is still reversibly deformable, such as an elastomer, a natural rubber or rubber material or a thermoplastic elastomer. Alternatively, the proportion of constituents having a high molecular weight or the degree of chemical or physical crosslinking can be increased in order to counteract creep.

Another advantageous embodiment of the invention provides that the sealing material comprises a so-called micro suction cup film, which expediently extends over the entire rear side of the dome and is attached thereto by means of an elastic adhesive, preferably by means of a thermoplastic adhesive, e.g. a hot melt adhesive or hot melt pressure sensitive adhesive. Micro suction cup films are known, inter alia, for removably fastening smartphones to charging stations.

In order to hold larger loads, either the dimensions of the suction cup or of the deformable part of the snap dome can be increased or a plurality of suction cups or snap domes can be arranged next to each other. In the latter case, for example, a plate or strip provided with hooks, magnets or other suspension or holding means can be attached to a plurality of separate suction cups or alternatively a plurality of snap domes can be formed next to each other into the plate or strip, the rear side of which is then provided with the sealing material, at least in the region of the snap domes, as described above.

BRIEF DESCRIPTION OF THE DRAWINGS

In the following, the invention is explained in more detail on the basis of some exemplary embodiments illustrated in the drawings.

DETAILED DESCRIPTION

The suction cups 10 illustrated in the drawings are intended to be removably fastened to an airtight substrate 12 having a generally planar surface 14. The substrate 12 can be, for example, a glass pane, a wall tile, a wall or door of a piece of furniture or of an appliance, such as a cupboard, an oven or a refrigerator, having a surface 14 of plastic, melamine, wood, lacquer or metal. The surface 14 can be planar or even slightly uneven, as long as the irregularities are lower than approximately 0.8 mm and do not have steep transitions.

Figure 23:
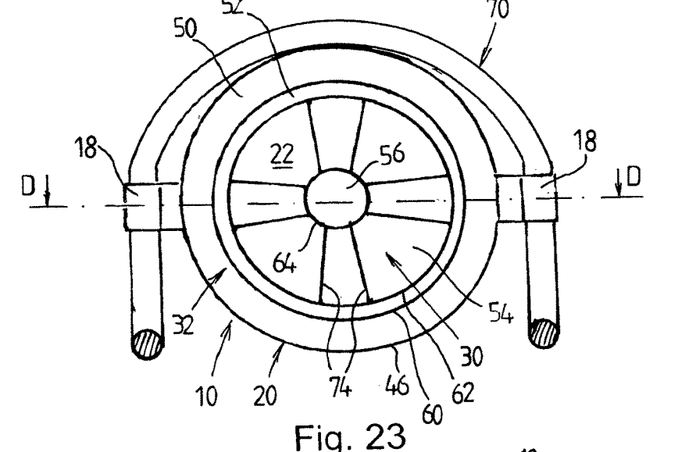
FIG. 23 shows a front view of a further suction cup according to the invention.
Figure 24:
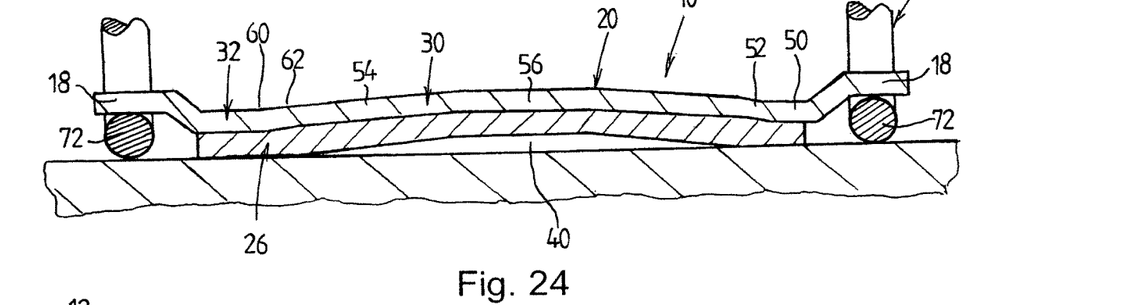
FIG. 24 shows an enlarged cross-sectional view of the suction cup along the line D-D in FIG. 23 in the rest state.

The suction cups 10 in FIGS. 1 to 22 and 25 to 28 are parts of suction hooks for suspending towels, clothing or other objects and for this purpose have a hook portion 16, whereas the suction cup 10 in FIGS. 23 and 24 serves to fasten soap dishes, toilet paper holders or similar objects to a vertical surface 14 and has two holding portions 18. However, the suction cups 10 are also suitable for removable fastening to surfaces 14 that are not oriented vertically, the load taken up by the suction cup 10 acting both parallel and perpendicular to the surface 14.

Apart from the hook portion 16 or the holding portions 18, the suction cups 10 consist essentially only of a flat elastically deformable snap dome 20 that has a visible or front side 22 facing away from the substrate 12 and a rear side 24 facing towards the substrate 12, and a resilient airtight sealing material 26 on the rear side 24 of the snap dome 20. The visible or front side 22 of the snap dome 20 at the same time also forms the visible or front side of the suction cup 10.

The snap dome 20 is manufactured by punching and shaping from a resilient stainless steel, preferably from a stainless spring band steel X10CrNi18-8 (material no. 1.4310) or from an electroplated and/or painted spring steel sheet. The sheet thickness of the steel sheet used is between 0.2 and 0.4 mm, preferably between 0.25 and 0.35 mm and most preferably approximately 0.3 mm. If such a snap dome 20 is deformed before being coated with the sealing material 26, it will emit an audible click sound when it returns to the rest state.

The snap dome 20 has no through-openings at all, so that its visible or front side 22 forms a closed surface, no air can penetrate through the snap dome 20 and the snap dome 20 completely covers or conceals the sealing material 26. The snap dome 20 comprises a reversibly deformable central portion 30 and a peripheral rim portion 32, which surrounds the central portion 30 and will not deform or only slightly deform upon a reversible deformation of the central portion 30. The sealing material 26 has a front face 34 that adheres in an airtight manner to the rear side 24 of the snap dome 20, and a rear face 36 that faces the substrate 12.

Figure 1:
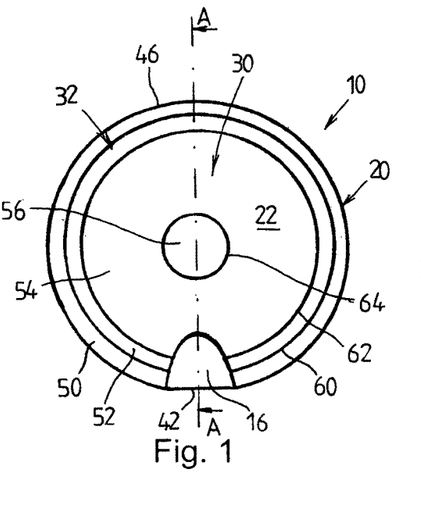
FIG. 1 shows a front view of a suction cup according to the invention having a snap dome.
Figure 2:
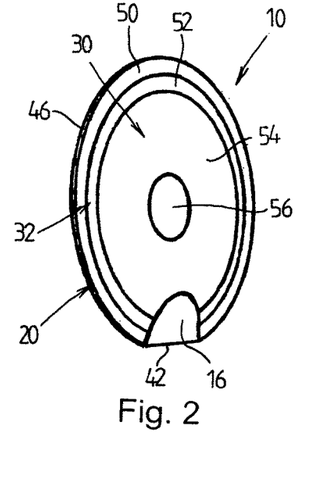
FIG. 2 shows a perspective view of the suction cup.
Figure 3:
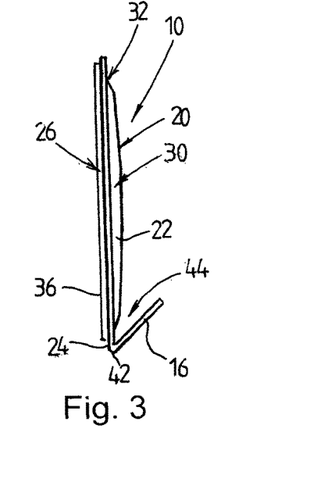
FIG. 3 shows a side view of the suction cup.
Figure 4:
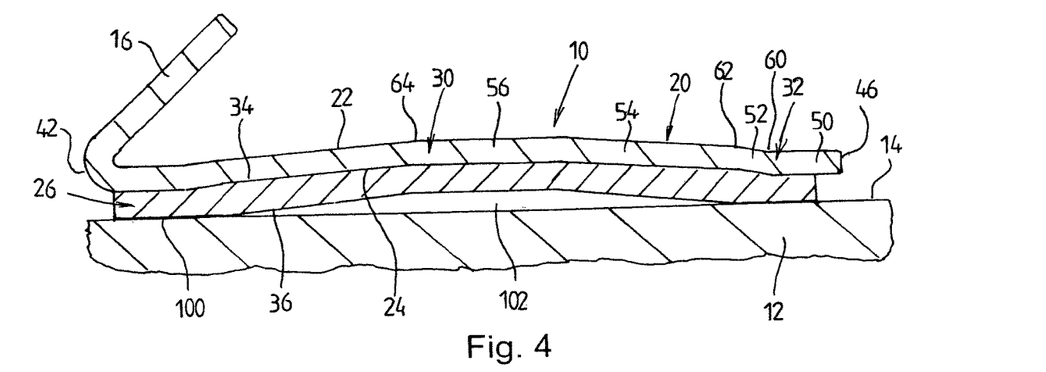
FIG. 4 shows an enlarged cross-sectional view of the suction cup in FIG. 1 along the line A-A in the rest state after having been applied to a substrate.
Figure 5:
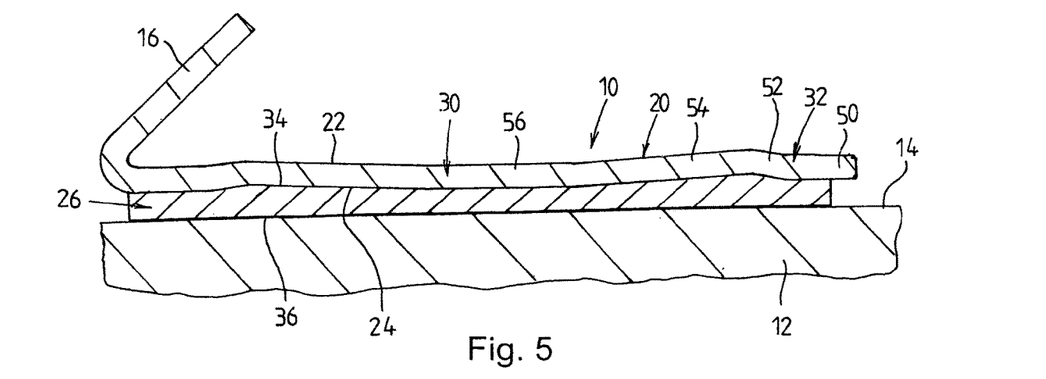
FIG. 5 shows a corresponding cross-sectional view of the suction cup in the deformation state when being pressed against the substrate.

In order to fasten it to the substrate 12, the suction cup 10, in a rest state of the snap dome 20, can be applied with the sealing material 26 to the surface 14 of the substrate 12, as exemplarily shown in FIG. 4. If, in this state, a sufficiently large compressive force is exerted onto the center of the visible or front side 22 of the snap dome 20, the snap dome 20, or the central portion 30 thereof, is deformed into an unstable or metastable deformation state, as exemplarily illustrated in FIG. 5. When the compressive force is relieved, the snap dome 20 will return by itself from the deformation state in the direction of the rest state.

Figure 6:
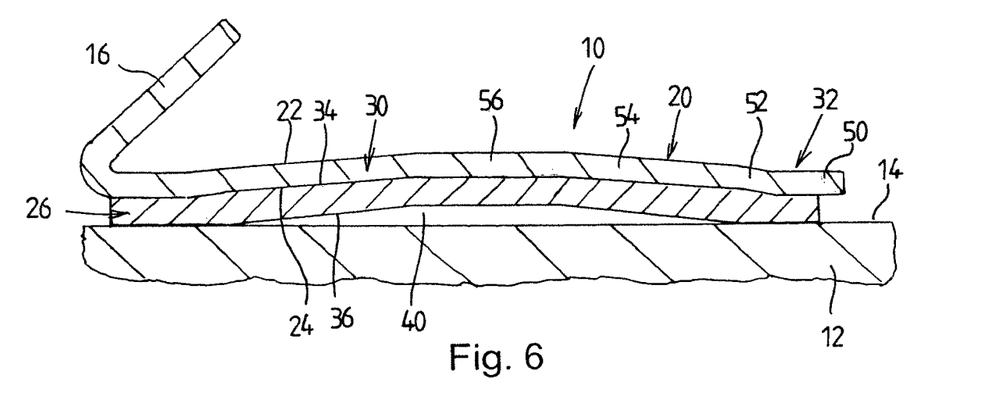
FIG. 6 shows a corresponding cross-sectional view of the suction cup after the relief of the compressive force and the return of the snap dome to the rest state.
Figure 7:
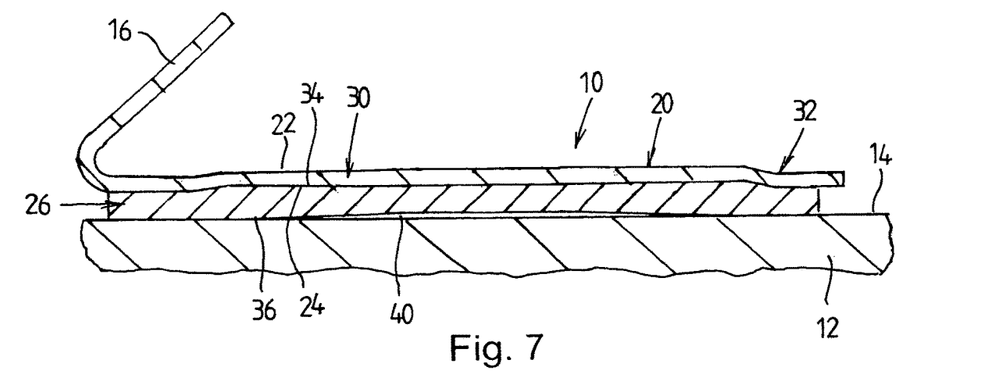
FIG. 7 shows a corresponding cross-sectional view of a suction cup with a thinner snap dome, which does not return to the rest state after the compressive force has been relieved.

If the snap dome 20 is made of stainless spring band steel X10CrNi18-8 the sheet thickness of which is 0.35 mm or more at a diameter of approximately 35 to 40 mm, then the central portion 30 of the snap dome 20 will snap back into the rest state when the compressive force is relieved, as illustrated in FIG. 6. The distance traveled by the center of the snap dome 20 is referred to as stroke and is about 1 mm. In contrast, if the sheet thickness is about 0.25 mm or less, the central portion 30 of the snap dome 20, upon relief of the compressive force, will only partly recover from the deformation state in the direction of the rest state, as illustrated in FIG. 7.

In both cases, a cavity 40 is formed between the surface 14 of the substrate 12 and the rear side 24 of the snap dome, the height of which corresponds in the first-mentioned case to the stroke, and in the latter case is only 0.1 to 0.2 mm. The sealing material 26, which abuts against the substrate 12 around the cavity 40, prevents air from entering into the cavity 40, so that a negative pressure or vacuum is generated there in both cases.

In the suction cups 10 in FIGS. 1 to 24, the hook portion 16 or the holding portions 18 consist of the same spring steel sheet as the snap dome 20 and are punched out and formed during the punching and forming of the snap dome 20, so that the hook portion 16 or the holding portions 18 project beyond the outer circumference 46 of the snap dome 20. The hook portion 16 of the suction cups 10 in FIGS. 1 to 22 is bent along a straight bending line 42 at an acute angle in the direction of the center of the snap dome 20, so that, after the attachment of the suction cup 10 to the substrate 12, it points obliquely upwards and delimits with the visible or front side 22 of the snap dome 20 an upwardly open V-shaped gap 44 wherein a load can be suspended. In order to minimize the moment, which is exerted by the load to the suction cup, the lowest point of the V-shaped gap 44 is located, on the one hand, as close as possible to the surface 14 of the substrate 12 and, on the other hand, as close as possible to the lowest point of the circumference 46 of the snap dome 20, about which the suction cup is pivoted if it unintentionally breaks loose from the surface. The former is achieved by virtue of the fact that the bending radius at the transition between the snap dome 20 and the hook portion 16 is less than 5 mm and most preferably less than 3 mm. The latter is achieved when the bending line 42 is tangential to the outer circumference 46 of the snap dome, i.e. when the hook portion 16 does not protrude downwards beyond the outer circumference 46 of the snap dome 20. Alternatively, however, the hook portion 16 can also project slightly downwards beyond the circumference 46 of the snap dome 20 and/or have a rounded cross-section.

The snap domes 20 of the suction cups 10 in FIGS. 1 to 7, 10 to 14 and 16 to 25 have a circular contour and a diameter of between 30 and 50 mm. In the case of these snap domes 20, the deformable central portion 30 has a diameter of between 20 and 25 mm and thus a surface area of approximately 300 to approximately 500 mm$^2$.

In the suction cups 10 in FIGS. 1 to 7, 10 to 13 and 23 and 24, the peripheral rim portion 32 of the snap dome 20 comprises an outermost rim section 50, which is parallel to the surface 14 of the substrate 12 and which extends in an annular manner along the entire circumference 46 of the snap dome 20, and a frusto-conical section 52, which is surrounded by the rim section 50 and the angle of inclination of which is approximately 5 to 10 degrees. The central portion 30 comprises a flatter frusto-conical section 54 that adjoins to the frusto-conical section 52 of the circumferential rim portion 32, the angle of inclination of which is approximately 2 to 5 degrees, and a generally flat central section 56, which is parallel to the rim section 50 or to the surface 14. Between each of the adjacent sections 50, 52; 52, 54; 54, 56 there is a circumferential circular embossed line 60, 62, 64 that is formed during the forming. The embossed lines 60, 62, 64 define concentric buckling or weakening lines which facilitate the deformation of the snap dome 20.

As can be seen by comparison of FIGS. 4 and 5, 10 and 11 and 12 and 13, in the rest state the visible or front side 22 of the snap dome 20, in the region of the two sections 54, 46 of the central portion 30, is convexly curved in relation to the flat surface 14 of the substrate 12, whereas in the deformation state it is concavely curved in relation to the surface 14. In each case the angle of inclination is approximately the same.

Figure 14:
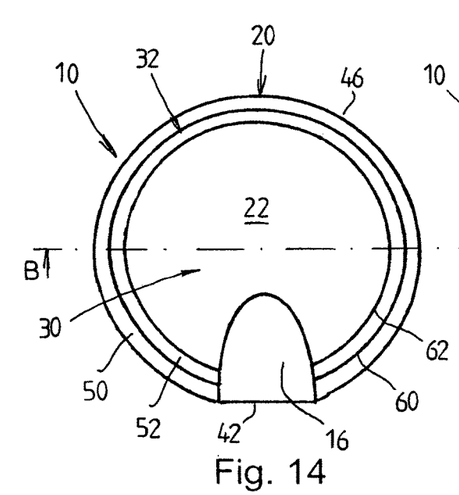
FIG. 14 shows a front view of a further suction cup according to the invention.
Figure 16:
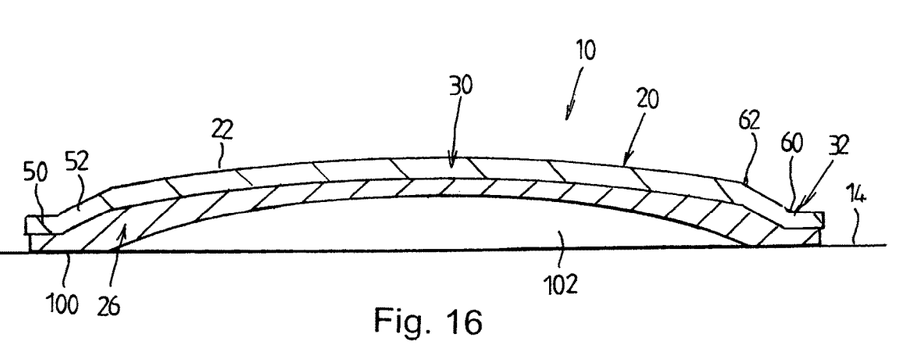
FIG. 16 shows an enlarged cross-sectional view of the suction cup in FIG. 15 along the line B-B in the rest state.
Figure 17:
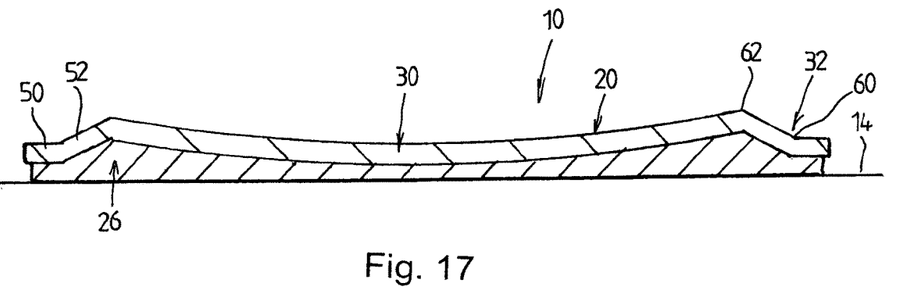
FIG. 17 shows a corresponding cross-sectional view of the suction cup in FIG. 15 in the deformation state.
Figure 18:
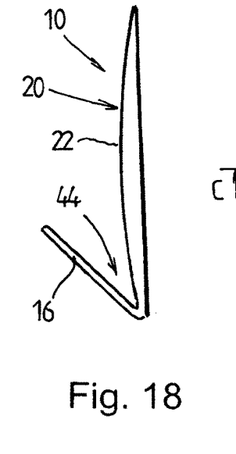
FIG. 18 shows a side view of another suction cup according to the invention.
Figure 19:
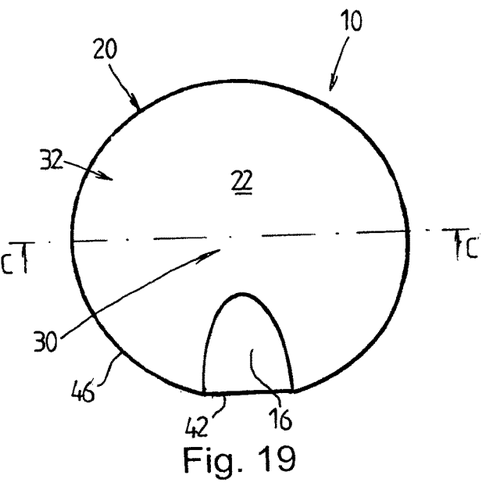
FIG. 19 shows a front view of the suction cup in FIG. 18.
Figure 20:
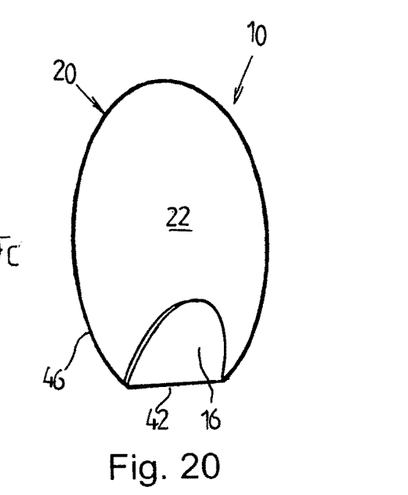
FIG. 20 shows a perspective view of the suction cup in FIGS. 18 and 19.
Figure 21:
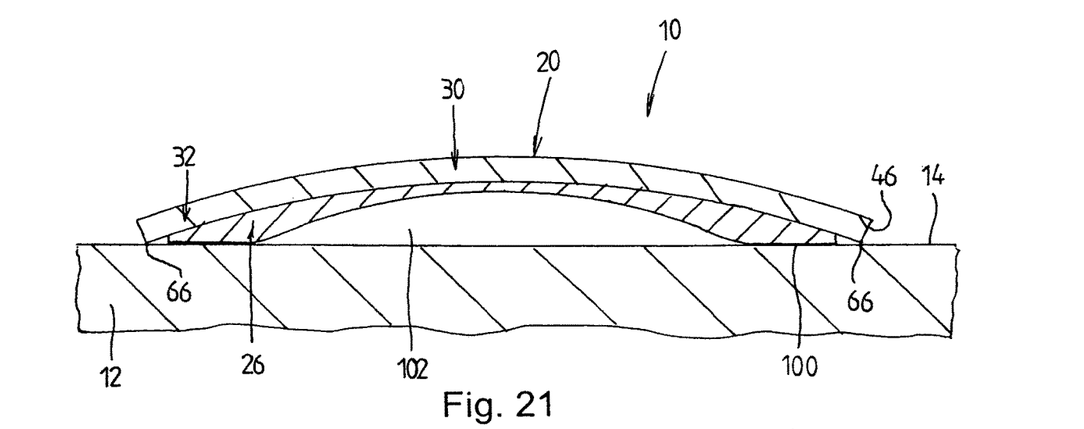
FIG. 21 shows an enlarged cross-sectional view of the suction cup in FIG. 19 along the line C-C in the rest state.
Figure 22:
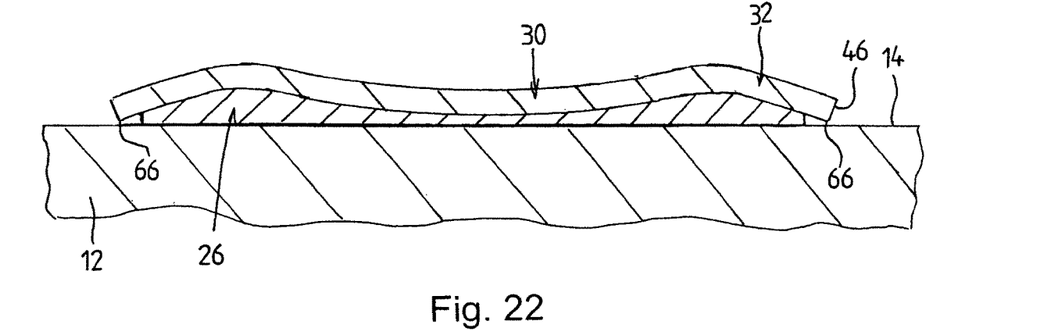
FIG. 22 shows a corresponding cross-sectional view of the suction cup in FIG. 19 in the deformation state.

In the suction cups 10 in FIGS. 14, 16 and 17, in the rest state the visible or front side 22 is uniformly convexly curved in the region of the deformable central portion 30 of the snap dome 20, the maximum angle of inclination in relation to the surface 14 being less than 10 degrees. The bow can either have a constant radius of curvature, as illustrated in FIG. 16, or alternatively a radius of curvature that decreases from the outside to the inside. As in the suction cups 10 in FIGS. 1 to 7, the peripheral rim portion 32 comprises an outermost rim section 50 parallel to the surface 14 of the substrate 12 and a frusto-conical section 52 surrounded by the rim section 50, however, the angle of inclination thereof with respect to the surface 14 is steeper and is approximately 20 to 40 degrees.

In contrast, in the suction cup 10 in FIGS. 18 to 22, in the rest state the entire visible or front side 22 of the snap dome 20 is convexly curved, as a result of which the aesthetic appearance can be further improved. In addition, an outer peripheral edge 66 of the outer circumference 46 of the snap dome 20, which faces the substrate 12, abuts against the surface 14 or is disposed in only a very small distance from the substrate 12, which likewise improves the aesthetic appearance.

Figure 26:
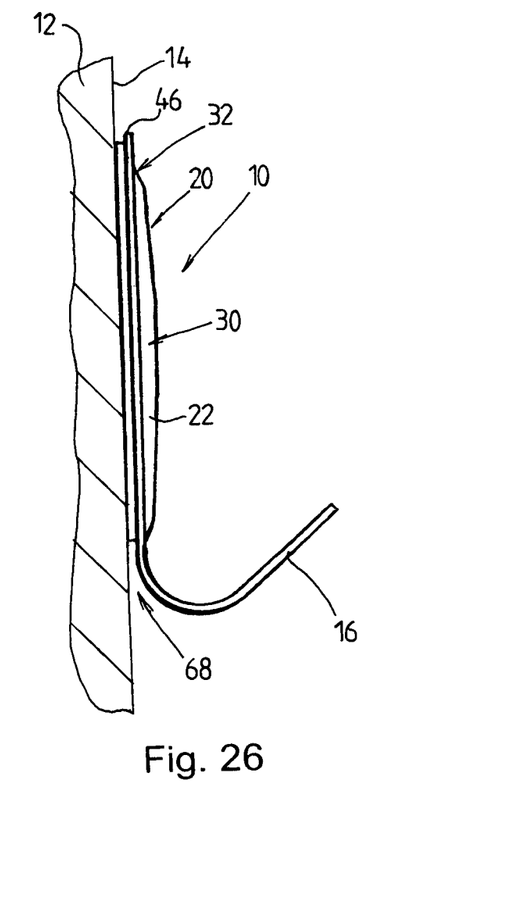
FIGS. 26 and 27 depict side views of a suction cup according to FIGS. 1 to 6, however, with modified hook portions.
Figure 27:
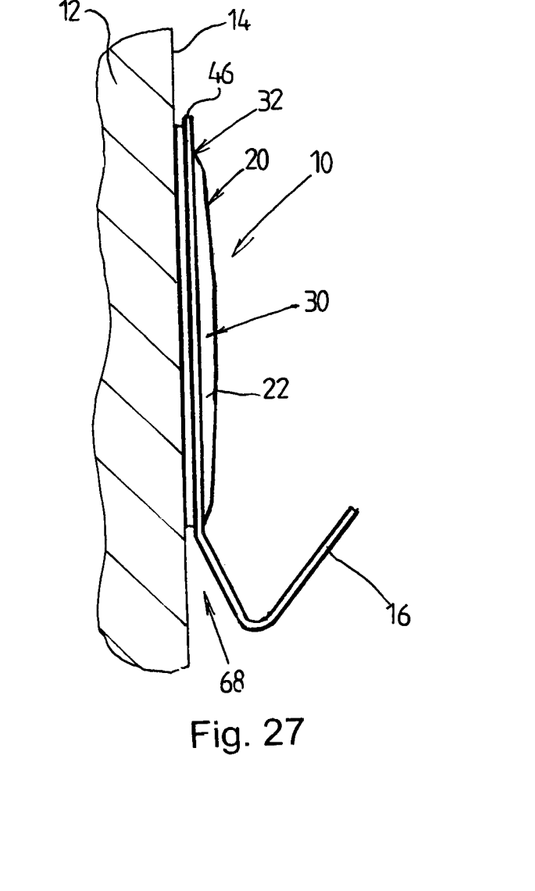

The suction cups 10 in FIGS. 26 and 27 correspond essentially to the suction cups 10 in FIGS. 1 to 6, however, the hook portions 16 are shaped differently, in order to facilitate the removal of the suction cup 10 from the substrate 12. In the suction cup 10 in FIG. 23, the hook portion 16 is bent in a V-shape. In the suction cup 10 in FIG. 23, the hook portion 16 is curved. In both cases, the hook portion additionally protrudes downwardly beyond the circumference 46 of the snap dome 20, as a result of which between the substrate 12 and the hook portion 16 a gap 68 is defined, which tapers upwards.

The suction cup in FIGS. 23 and 24 likewise corresponds essentially to the suction cups 10 in FIGS. 1 to 6. However, one difference is that instead of the hook portion 16 at the lower edge of the snap dome 10, there are two identically shaped holding portions 18 provided at two diametrically opposite locations on the circular circumference 46 of the snap dome 20. The holding portions 18 protrude outwards beyond the circumference 46, their free end being oriented generally parallel to the surface 14. The free end, however, is in a distance from the surface 14, so that the open space formed behind the ends can serve to receive parts of a holder, for example two parallel round rods 72 of a curved holder 70 of a basket for receiving shower gel or shampoo. As illustrated in FIG. 23, conveniently the holder 70 rests at the top of the suction cup 10 or snap dome 20 on the circumference 46, but is not retained there by a holding portion, so that moments are only introduced into the two holding portions 18.

A further difference is that the flatter frusto-conical section 54 of the central portion 30 is provided with four pairs of embossed lines 74, which extend from the circular embossed line 64 to the circular embossed line 62. In this case the adjacent embossed lines 74 diverge slightly, but are not oriented radially. By means of such pairs of embossed lines 74, the energy stored in the snap dome 20 after the deformation can be increased while the sheet thickness remains the same.

Figure 15:
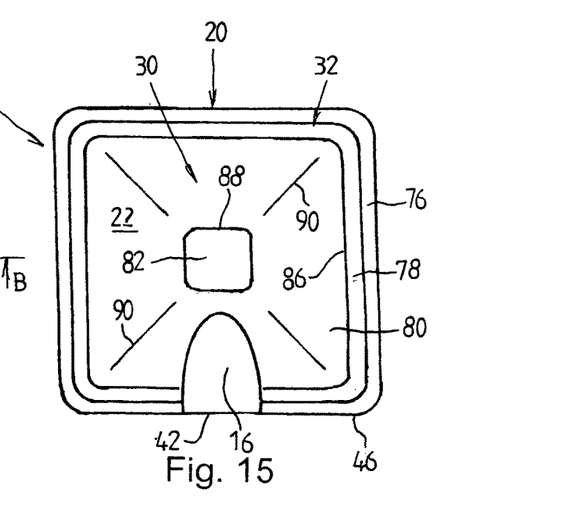
FIG. 15 shows a front view of a still further suction cup according to the invention.

In the suction cup 10 in FIG. 15, both the peripheral rim portion 32 and the central portion 30 of the snap dome 20 have a square contour with rounded corners. The peripheral rim portion 32 comprises a flat circumferential rim section 76 and a truncated pyramidal section 78 with an angle of inclination of 30 to 40 degrees with respect to the rim section 76. The central portion 30 comprises a flatter truncated pyramidal section 80 adjoining the section 78, whose angle of inclination in relation to the rim section 76 is less than 10 degrees, and a generally planar central portion 82, which is parallel to the rim section 76 or to the surface 14 of the substrate 12. Between the adjacent sections 76, 78; 78, 80; 80, 82 there are disposed in each case circumferential embossed lines 84, 86, 88. Four further embossed lines 90 extend along the diagonals through the flatter truncated pyramidal section 80.

Figure 8:
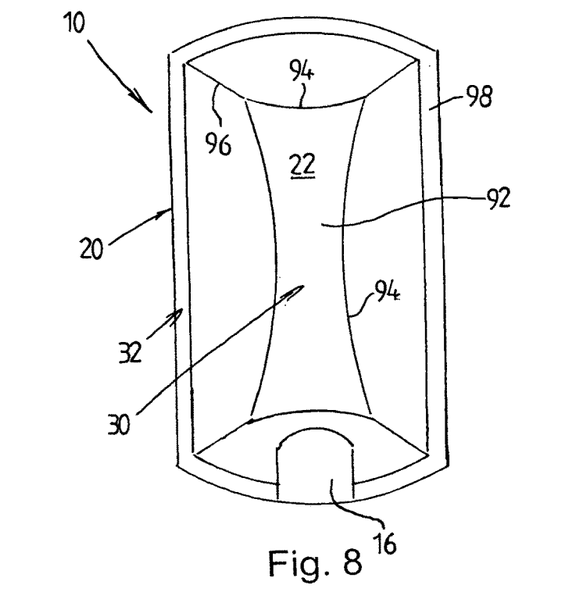
FIG. 8 shows a front view of another suction cup according to the invention.
Figure 9:
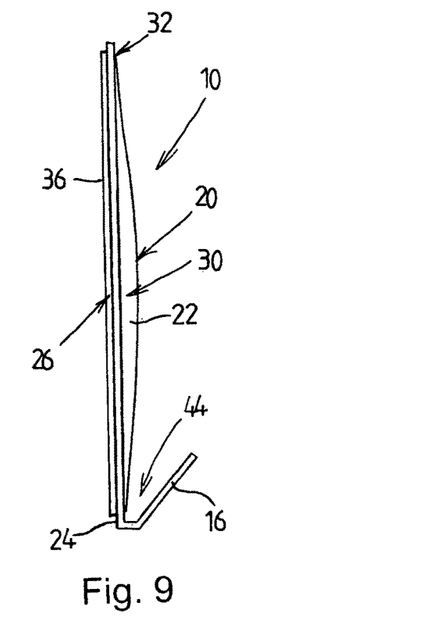
FIG. 9 shows a side view of the suction cup in FIG. 8.

In the suction cup 10 in FIGS. 8 and 9, the snap dome 20 has a generally rectangular contour with a rounded upper and lower edge. The central portion 30 comprises an elongated central panel 92, which is delimited by four embossed lines 94 that are concavely curved towards the panel 92 and are symmetrical in pairs. From each of the four corners of the central panel 92, a straight embossed line 96 extends into the vicinity of the adjacent corner of the snap dome 20. Here, the peripheral rim portion 32 comprises only one circumferential rim section 98 that is parallel to the surface 14 of the substrate 10.

In all suction cups 10, the sealing material 26 essentially covers the entire rear side 24 of the snap dome 20 as a continuous layer, apart from a narrow annular region, which adjoins the circumference 46 of the snap dome 20, so that, when the suction cup 10 is viewed from the front or obliquely from the front, the sealing material 26 is not visible.

In the suction cups 10 in FIGS. 4 to 7, 10 to 13, 16 and 17 as well as 23 and 24, the layer of the sealing material 26 has a constant thickness behind the rear side of the flat outermost rim section 50 or 76 of the peripheral rim portion 32. Behind the rear side of the adjoining section 52 or 78 of the peripheral rim portion 32, the thickness of the sealing material 26 then increases up to the embossed line 62 or 86, and then decreases again from there up to the embossed line 64 or 88. The maximum of the thickness is located behind the transition between the deformable central portion 30 and the peripheral rim portion 32 that is formed by the embossed line 62. The minimum of the thickness is located behind the center of the snap dome 20 or the central section 56.

In the suction cup 10 in FIGS. 18 to 22, the thickness of the sealing material 26 also first increases and then decreases from the outside to the inside, the maximum of the thickness being likewise located behind the transition between the deformable central portion 30 and the peripheral rim portion 32 and the minimum of the thickness is in the center of the snap dome 20.

The sealing material 26 is an elastically deformable material, which is relatively soft and yielding and has a Shore hardness C of less than 30, better still less than 20, so that it can fit or adapt very well to the surface 14 of the substrate 12. Examples of suitable sealing materials 26 having such a Shore hardness C are silicone, elastomers, rubber or rubber materials, plasticized PVC or thermoplastic elastomers, of which those are preferred which can be molded directly onto the rear side 24 of the metallic snap dome 20 by injection molding. Alternatively, however, the sealing material 26 can also be preformed and then adhesively bonded to the rear side 24 of the snap dome 20.

Figure 10:
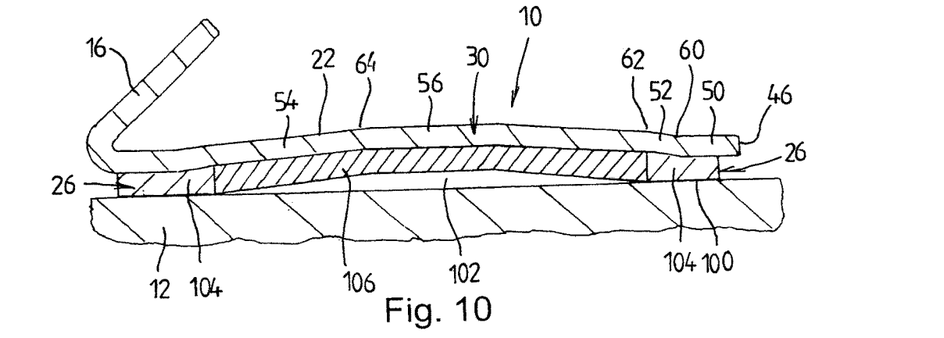
FIG. 10 shows an enlarged cross-sectional view of a further modified suction cup in the rest state.
Figure 11:
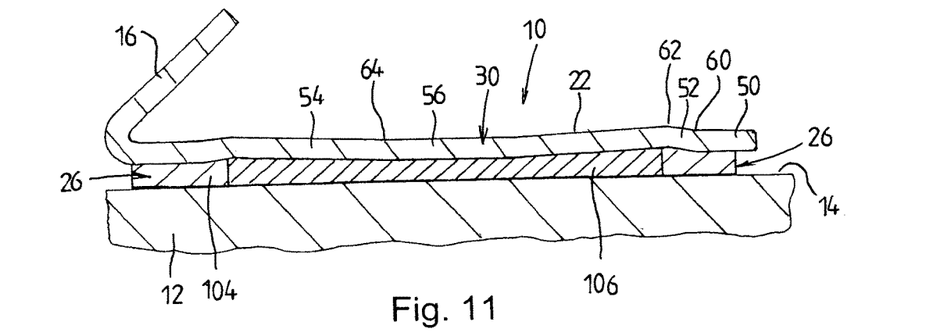
FIG. 11 shows an enlarged cross-sectional view of the suction cup in FIG. 10 in the deformation state.
Figure 12:
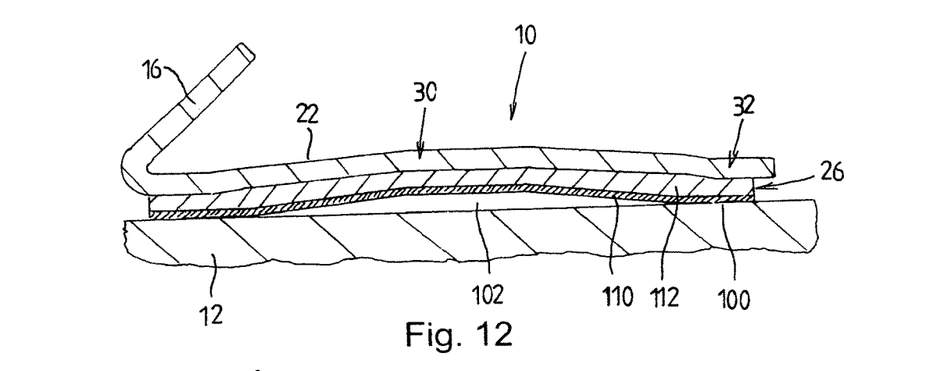
FIG. 12 shows an enlarged cross-sectional view of a still further modified suction cup in the rest state.

During the forming of the sealing material 26, the rear face 36 thereof is designed in such a way, that, in the rest state of the snap dome 20, behind the peripheral rim portion 32 it has an elevated flat annular sealing surface 100 for application against the surface 14 of the substrate 12 and behind the central portion 30 it has a shallow concave depression 102 that is surrounded by the sealing surface 100, as illustrated for example in FIGS. 4, 10 and 12. In the deformation state of the snap dome 20, the rear face 36 is completely flat and parallel to the surface 14, as shown, for example, in FIGS. 5, 11 and 13.

In all the suction cups 10, the shape and the thickness of the sealing material 26 are chosen in such a way, that the latter, in a region surrounded by the sealing surface 100 behind the deformable central portion 32 of the snap dome 20, is raised so far from the surface 14 of the substrate 12, that without any noticeable compression of the sealing material 26 the central portion 30 can be deformed into the deformation state, where the visible or front side 22 is concavely curved and the rear face of the sealing material 26 is flat.

Hot-melt adhesives are used as the preferred sealing material 26, since they adhere to the substrate 12 not only by static friction forces, but additionally by adhesive forces. In the case of hot melt pressure-sensitive adhesives, the adhesive forces increase with increasing surface pressure, so that by means of a high compressive force in conjunction with a small contact surface, a maximization of the adhesive forces and thus the adhesion to the substrate 12 is possible. In addition, a high surface pressure also contributes to a good sealing effect. It is preferred to use hot melt adhesives having a low bond strength (low tack) which can be removed from most substrates without any residue and thus allow multiple fastening of the suction cup 10 despite of the adhesion to the substrate. Thermoplastic hot melt pressure sensitive adhesives (hot melt PSAs) are best suited, because those can be formed at a relatively low pressure and moderate temperature and at the same time bonded to the rear side 24 of the snap dome 20, for example by injection molding. Examples of such pressure-sensitive adhesives are available from gluegunsdirect.com under the designations "Tecbond 2507 FS", "Removable Credit Card Glue" or "Low Tack Dot Shot Pro", from Klebeshop24.de under the designation "SuperDots Easy Tack", from Glue Dots International under the designation "Removable Glue Dots" or from TESA SE under the designation "tesa TACK transparent". In order to improve the adhesion of the pressure-sensitive adhesive to the rear side 24 of the snap dome 20, the latter can be coated with a primer or adhesion promoter.

Some pressure-sensitive adhesives however tend to creep after the attachment of the suction cup 10 to the substrate 12, for example because the snap dome 20 is pressed against the substrate 12 by the negative pressure in the cavity 40 and thus the sealing material 26 between the snap dome 20 and the substrate 12 in the region of the sealing surface 100 is subjected to a pressure. This causes an even better sealing of the cavity 40 but also a slow irreversible deformation of the sealing material 26, so that after some time the snap dome 20 can no longer be deformed into the deformation state. This makes it more difficult to remove the suction cup 10 from the substrate 12 and also prevents a renewed attachment to the substrate 12.

For this reason, the sealing material 26 in the suction cup 10 in FIGS. 10 and 11 comprises a pressure-sensitive adhesive 104 that covers an annular region behind the peripheral rim portion 32 and forms the sealing surface 100, and another elastically deformable material 106 that does not tend to creeping, covers the rear side of the central portion 30 and in the deformation state can fit tightly against the surface 14, such as, for example, a silicone, rubber or rubber material or a thermoplastic elastomer (TPE).

Figure 13:
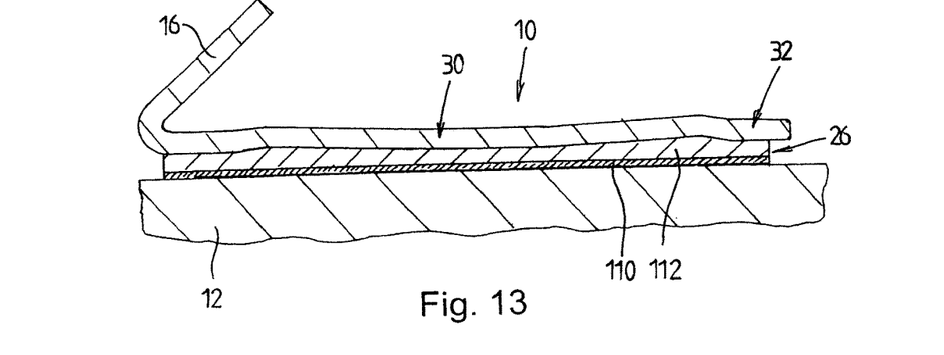
FIG. 13 shows an enlarged cross-sectional view of the suction cup in FIG. 12 in the deformation state.

In the suction cup 10 in FIGS. 12 and 13, the sealing material 26 comprises a micro suction cup film 110, which extends over the entire rear face 36 of the sealing material 26 facing the substrate 12, and an elastic hot melt adhesive 112, which bonds the film 110 in an airtight and fixed manner to the rear side 24 of the snap dome 20.

In the following, the attachment, the functionality and the removal of the suction cups 10 according to the invention are described in two examples: As specified above, for fastening the suction cup 10 in the rest state of the snap dome 20 it can be applied with the sealing material 26 to the substrate 10, as exemplarily shown in FIG. 4. When a compression or pressing force is then exerted to the center of the convexly curved visible or front side 22 of the snap dome 20, which exceeds a certain threshold value, the central portion 30 of the snap dome 20 will move under sudden deformation in the direction of the substrate 10, until it reaches the unstable or metastable deformation state, in which the visible or front side 22 is concavely curved in the region of the central portion 30, as exemplarily illustrated in FIG. 5. In the process, air is displaced from between the sealing material 26 and the substrate 12 into the surroundings. Upon reaching the deformation state, the sealing material 26 behind the central portion 30 will abut with its flat rear face 36 against the flat surface 14, thus completely displacing the air. When the compression force is subsequently relieved, the snap dome 20 will recover spontaneously in the direction of the rest state, forming the cavity 40 behind the central portion 30 and generating a negative pressure in the cavity 40.

Figure 25:
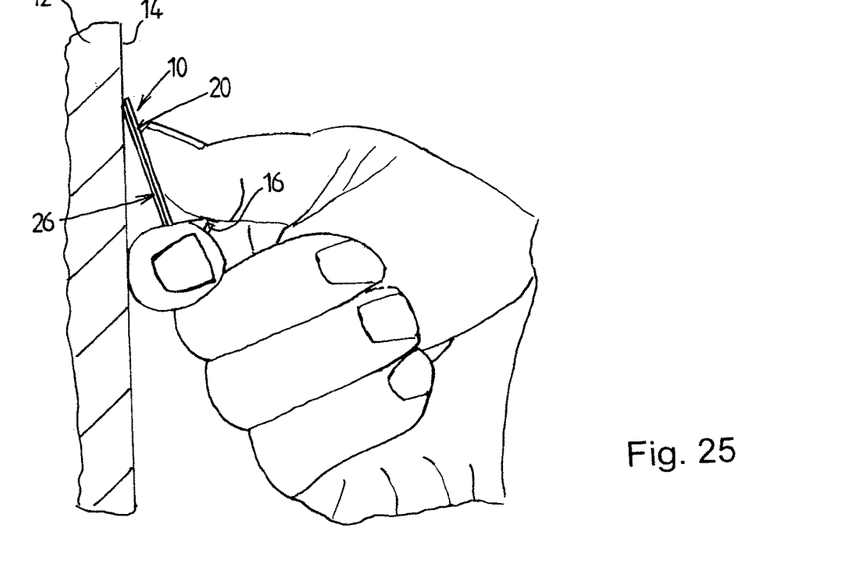
FIG. 25 shows a schematic view of a hand during the application or removal of a suction cup according to the invention.

Alternatively, however, the suction cup 10 can also be gripped by the thumb and the index finger of a hand, the thumb resting centrally on the visible or front side 22 of the snap dome 20, and the index finger engaging behind the hook portion 16, as illustrated in FIG. 25. Then, the suction cup 10, or the snap dome 20 respectively, is applied to the substrate 12 with a peripheral rim portion that is diametrically opposite from the hook portion 16, and a compressive force is exerted onto the center of the visible or front side 22, in order to deform the central portion through a generally planar bi-stable intermediate state into the unstable or metastable deformation state. As soon as the snap dome 20 has snapped into the deformation state and the rear face 36 of the sealing material 24 is plane, the inclination of the suction cup 10 in relation to the substrate 12 is reduced, until the entire surface of the sealing material 26 will rest flush against the surface 14. When the compressive force is subsequently relieved, the snap dome 20 will recover spontaneously in the direction of the rest state, once again generating a negative pressure behind the central portion.

In use, the snap dome 20 can assume either the rest state or an intermediate state, depending on the ratio of the sheet-metal thickness of the snap dome 20 to the surface area of the central portion 30. If this ratio exceeds a certain threshold value, then the snap dome 20 will immediately snap back from the unstable deformation state into the rest state upon relief of the compressive force. Below the threshold value, the snap dome 20 will remain in a metastable deformation state and will not return to the stable rest state before a small quantity of air has penetrated into the cavity.

In order to remove the suction cup 10, one side of the latter is lifted off from the substrate 12. For this purpose, the curved index finger of one hand can be hooked in at the hook portion 16 and a pulling force that is directed away from the substrate 12 can be exerted onto the hook portion 16, in order to allow air to flow into the cavity 40 at the lowest point of the sealing surface 100 and to gradually remove the sealing material 26 from the substrate 12. If a gap 68 is present between the hook portion 16 and the surface of the substrate 12, as in the suction cups 10 in FIGS. 26 and 27, the curved index finger can alternatively also be introduced into the gap 68, in order to lever the suction cup 10 on one side away from the substrate. In both cases, the removal can be facilitated by exerting a compressive force with the thumb centrally onto the visible or front side 22 of the snap dome 20, in order to deform the central portion 30 into the deformation state and, by eliminating the cavity 40, to produce a pressure compensation between the visible or front side 22 and the rear side of the snap dome 20, before or while a force is exerted onto the hook portion 16.

What is claimed is:

1. A suction cup for removably attaching to a substrate, the suction cup comprising:
   a compliant sealing material for applying to the substrate and an elastically deformable actuating portion for pressing against the substrate, and
   wherein the suction cup utilizes an elastic recovery of the actuating portion in order to generate a negative pressure between the suction cup and the substrate,
   wherein the actuating portion comprises a snap dome having a deformable central portion,
   wherein, in a stable rest state of the snap dome, a front side of the deformable central portion that faces away from the sealing material is at least partially convexly curved relative to the substrate, to which the suction cup is attached,
   wherein, for attachment of the suction cup to the substrate, the deformable central portion is deformed by a compressive force exerted onto the front side into a metastable or unstable deformation state,
   wherein, in the metastable or unstable deformation state, the front side is at least partially concavely curved relative to the substrate, and a central portion of the sealing material abuts against the substrate, and
   wherein, in the metastable or unstable deformation state, the deformable central portion reverses direction of movement and recovers automatically in the direction of the rest state when the compressive force is relieved, forming a cavity behind the central portion of the sealing material and generating the negative pressure in the cavity.

2. The suction cup according to claim 1, wherein the snap dome consists of a punched and formed stainless or coated spring steel sheet.

3. The suction cup according to claim 2, wherein the spring steel sheet has a thickness of more than 0.2 mm and less than 0.5 mm.

4. The suction cup according to claim 1, wherein the snap dome completely covers the sealing material.

5. The suction cup according to claim 1, wherein a maximum stroke of the snap dome during the deformation between the stable rest state and the unstable or metastable deformation state is less than 3 mm.

6. The suction cup according to claim 1, wherein the snap dome has a peripheral rim portion fixedly joined to the central portion and surrounding the deformable central portion, and wherein the peripheral rim portion is not deformed or is only insignificantly deformed during the deformation and the recovery of the deformable central portion.

7. The suction cup according to claim 6, wherein a maximum angle of inclination of the deformable central portion with respect to the substrate is less than 10 degrees.

8. The suction cup according to claim 1, wherein a continuous layer of the sealing material is applied to a rear side of the snap dome opposite from the front side.

9. The suction cup according to claim 8, wherein a film thickness of the continuous layer of the sealing material behind a center of the snap dome is less than behind a peripheral rim portion of the snap dome.

10. The suction cup according to claim 8, wherein a film thickness of the continuous layer of the sealing material first increases and then decreases from an outer circumference towards a center of the snap dome.

11. The suction cup according to claim 8, wherein the film thickness of the continuous layer of the sealing material is less than 2 mm and more than 0.5 mm.

12. The suction cup according to claim 1, wherein, in the rest state of the snap dome, a rear face of the sealing material opposite from the snap dome has a raised flat annular sealing surface for application to the substrate and a shallow concave depression surrounded by the sealing surface, whereas in the deformation state of the snap dome the rear face is flat or almost completely flat.

13. The suction cup according to claim 12, wherein the shallow concave depression has the same volume as a cavity that forms between the sealing material and the substrate during the return of the deformed snap dome into the rest state.

14. The suction cup according to claim 12, wherein a depth of the shallow concave depression in relation to the surrounding sealing surface is larger than half of a stroke of a center of the snap dome during the deformation from the rest state into the deformation state and less than or equal to the stroke.

15. The suction cup according to claim 1, wherein the sealing material is made at least partially from a pressure-sensitive adhesive (PSA).

16. The suction cup according to claim 15, wherein the pressure-sensitive adhesive is a removable pressure-sensitive adhesive.

17. The suction cup according to claim 16, wherein a tack of the removable pressure-sensitive adhesive is less than 500 g, as measured with a Polyken Probe Tack Tester at 23° C., and with a residence time of 1 s.

18. A suction hook, comprising the suction cup according to claim 1 and a hook portion projecting beyond the snap dome.

19. A suction cup according to claim 1, wherein the sealing material is injection molded to a rear side of the snap dome.

20. A suction cup according to claim 1, wherein the snap dome is generally circular and wherein a ratio of a maximum height of the suction cup, as measured from the substrate to a highest point of the front side of the snap dome, to a diameter of the suction cup is less than 1:10.

* * * * *

UNITED STATES PATENT AND TRADEMARK OFFICE
CERTIFICATE OF CORRECTION

PATENT NO. : 10,895,279 B2
APPLICATION NO. : 15/776368
DATED : January 19, 2021
INVENTOR(S) : Götz Thomas Page 1 of 1

It is certified that error appears in the above-identified patent and that said Letters Patent is hereby corrected as shown below:

In the Claims

Column 17, Claim 6, Line 47: insert --deformable-- at the beginning of Line 47 before "central portion"

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*